United States Patent Office 3,806,562
Patented Apr. 23, 1974

3,806,562
PROCESS FOR THE PREPARATION OF THERMOPLASTIC MATERIAL FROM RECOVERY PLASTICS MATERIAL
Pierre Lamort, 4 Rue du Bac, and Jean Pierre Lamort, Place du Marechal Joffre, both of 51 Vitry le Francois, France
No Drawing. Filed Aug. 23, 1971, Ser. No. 174,154
Claims priority, application France, Sept. 9, 1970, 7032715
Int. Cl. E04b 1/16
U.S. Cl. 264—31
10 Claims

ABSTRACT OF THE DISCLOSURE

Process for production of composite products from waste plastic materials utilizing plastics having separate and distinct softening temperatures. The waste material has various thicknesses and densities and is compacted into a flat form having superposed layers packed one against another but not agglomerated, cutting the rolled mixture into strips, cutting the strips to form rods and then separating the layers. The resulting rods are separated by density into light and heavy rods and then each group of light and heavy rods is separated by thickness. The various groups of rods may be recombined in proportions to form various molding mixes. Fillers such as sand, cement, plaster, stone, brick, and gravel may be added to the mix. The mix may be formed by rollers into a sheet or may be spread on a surface and rolled to provide a compacted surface covering.

---

The present invention relates to a process for the preparation of thermoplastic material from recovery plastics material, and also the products obtained by means of this process.

The recovery of old plastics materials in a manner similar to that which is already undertaken for waste paper, rags and scrap metals, is desirable so as to avoid the accumulation of waste materials which cannot be destroyed biologically.

However, numerous problems are encountered in this recovery.

In effect, the characteristics of the plastics materials which are used vary within wide limits. There are those of all origins, both thermoplastic and thermosetting, and in the first group the softening temperatures can vary to a high degree. The reuse thereof has hitherto only been possible for homogeneous batches of identical characteristics, a sorting operation being impossible in practice.

An exploitable recovery process should thus permit of plastics materials of any origin and nature to be used without discrimination and without any sorting.

Another difficulty encountered in the reuse of scrap plastics materials resides in the fact that, like all recovery material, they contain foreign bodies of very varied natures, thus forming as many impurities for the final product which it is desired to obtain. Any efficient and economical process for reusing old plastics materials must therefore permit these impurities to be eliminated by simple mechanized means.

Finally, a third difficulty in the reuse of scrap plastics materials arises from the fact that these latter, like any other material being recovered, originate from batches of variable composition from which it is necessary to obtain a product of substantially constant characteristics.

The present invention has for its object to provide a solution for these problems and it is concerned with a process for the manufacture of thermoplastic materials from recovery plastics materials, in which the objects or pieces of the recovery plastics material of any origin and nature are ground and finely divided and mixed by means of appropriate apparatus so as to obtain a homogeneous powder of fine particles and that the powder thus obtained is heated in a mixer, to reach a temperature just sufficient for obtaining the softening of the thermoplastic material of low softening point contained in the mass, so that the part of the plastics material which has softened flows in all directions and covers the other non-softened particles, the softened plastics material acting as a binder and the non-softened plastics material acting as a filler.

By plastics material "of low softening point" is to be understood the material softening between about 110° and 140° C., as opposed to the thermoplastic material of higher softening point (about 200°–300° C.).

In this way, a homogeneous paste is obtained, of which it is obviously possible to regulate the characteristics by conducting to a greater or lesser degree the operation of division in the first phase and by varying the temperature and the mixing time. This paste will then be able to be worked like any other plastics material and, depending on the products to be obtained, by drawing, extrusion, moulding under pressure or rolling.

It is to be noted here that it may be of interest in certain cases to add to the powder of recovered plastics materials a certain quantity of powder of thermoplastic material with a low softening temperature, so as to have sufficient of the binder softening at low temperature in order to be able to work the paste as indicated above.

It is likewise possible to take advantage of the powdery phase of the process for introducing and mixing with the composition all additional elements which may be desired, such as mineral fillers (cements, kaolin, brick powder, etc.), coloring pigments and fibers or filaments (cellulose, glass fibers, etc.). These additional elements are then amalgamated and fixed in the mass during mixing.

One important condition for obtaining a plastics material of good quality is the homogeneity and the constancy of its composition. This is obtained by making use of the fact that, according to the first phase of the process, the material is reduced to a powder having sufficiently fine particles to be able to store it in a large quantity, of which it is however possible to readily ensure the stirring and thus the mixing. For obtaining a substantially constant production, it will be preferable for this homogeneous stock to correspond to a sufficiently long manufacturing time, so that the different batches of initial material used during this period are sufficiently numerous to give finally a substantially constant mean composition.

After the phase of reduction to powder form, it is also preferable to carry out a refining of the powder, the purpose of this refining operation being to eliminate the fine dusty particles, on the one hand, and the voluminous foreign bodies and the insufficiently divided lumps, on the other hand.

This refining operation will be carried out by any suitable means, such as a stream of air (aerocyclone) for the fine particles, and a screening for the second.

It has moreover been found that, for numerous applications of the process, it is desirable to give the particles of the recovered plastics powder the form of elongated thin rods similar to filaments or fibres.

By operating in this manner, the advantage is obtained that the elements of the powder which are not replasticised during the operation form not only a filler, but also a true fibrous reinforcement, and this gives better mechanical qualities to the product finally obtained.

For obtaining this form of thin rod-like particles, it is possible to operate in various ways.

It has however been observed that one particularly efficient method consists in:

crushing the plastics objects originating from the recovery between rollers forming a rolling mill so as to obtain forms of flat cakes;
passing these cakes between rollers carrying cutter wheels which cut them into narrow strips;
passing these narrow strips into a rotating knife-type cutter, which delivers them as small rod-like elements having a length equal to the width of the strips.

The dimensions of the rods or filaments which are most appropriate obviously depend on the product which it is desired to obtain.

However, good results have been obtained with rods having a length of several millimeters up to about 15 mm. and a width of several tenths of a millimeter up to about 1.5 mm.; the thickness of the rods depends on the initial material and can vary within very wide limits, for example, between a few hundredths of a millimeter and 1 or 2 mm.

Actually, in practice, if the reduction to rods is carried out as described above, during the passage to the cold rolling mill of objects or pieces of recovered plastics, these latter are compressed into the form of cakes of small thickness formed by superimposed layers of plastics material packed one against the other, but not agglomerated. At the time of cutting, these layers are once again separated. Bags consisting of thin sheet material (a few hundredths of a millimeter) will give thin rods, while larger objects will give rods with a thickness which may extend up to that of the initial cakes.

Likewise, if the cutting rollers are regulated to give strips of 10 mm., this dimension will be the maximum length of the rods, but these can be smaller and the average dimension will be of the order of 5 to 8 mm.

In the following operation, if the cutters of the cutting arrangement are regulated to width of 5/10 mm., the rods will have an average width of 5/10 mm.

One of the advantages of this method, consisting in reducing the recovery material to thin rods, is that it permits a rough sorting between hard elements, which will not be replasticised, and relatively soft elements which correspond basically to the thermoplastic resins of low softening point.

Even such a rough sorting operation permits the production to be regularised and has an influence on the characteristics of the product which is obtained.

The hard resins in fact supply either the rods of greatest density, or the thickest rods (because they originate from objects with thicker walls), while the rods of a resin with a low softening point are generally lighter and thinner.

A separation according to densities (for example, by decantation into a liquid of appropriate density), followed by a separation according to thickness (for example, by means of a slit-type screen), finally makes it possible to regulate and standardise the respective proportions of the two types of resins in the mixture which will be subjected to the remainder of the process, and as a consequence the characteristics of the product resulting therefrom.

Obviously, if the preceding sorting operation provides a proportion of light and fine rods smaller than that which is desired, it will be possible to add to the mixture any powder of thermoplastic resin with a low melting point so as to achieve the desired proportion. Actually, the rods are only found in the finished product in respect of the hard resins, the particles of soft resin having lost their shape during the process.

The fibrous constitution given to the product after softening and flowing of the resins with a low softening point, owing to the preparation of the powder as thin rods as described above, permits the formation of sheets or films which are rolled continuously and have interesting mechanical features.

Such a continuous product will with advantage be carried out by the powder being spread as a regular layer and by this layer then being caused to pass between heating rollers. The presence of the hard thin rods which form a fibrous reinforcement avoids a too considerable flow at the moment of rolling and thus permits of using a relatively high working pressure relatively to the thickness of the manufactured product.

The powder thus obtained can have added thereto various mineral or organic fillers for obtaining products for special applications. In particular, intermediate products between plastics materials and cement or plaster are obtained by the above powder having added thereto a certain quantity of cement, plaster or a mixture of these products with sand, then by heating the mixture to the plasticisation temperature of the materials of low softening point, while exerting a pressure for the purpose of compacting the aggregate, this giving a plastics amalgam reinforced with a fibrous lattice, of which the pores are occupied by cement (or plaster); this product is then immersed in water for the time necessary for the liquid penetrating into the said pores sufficiently wetting the cement (or plaster) so that the latter is able to set, whereafter the product is removed from the water and the setting is allowed to occur.

The determination of the times necessary for the sufficient wetting of the cement or plaster depends on the proportion of filler and the dimensions of the compacted product. It has to be determined in each case by tests.

The invention also covers the preparation of a product to be used as a ground covering, consisting in mixing with the powder of plastics materials a fine aggregate or granulate, such as sand, or powdered or crushed brick, stone or gravel, and in bringing the whole to the plasticisation temperature of the materials of low softening point, while constantly stirring the mixture, for example, in a drum, in such a way that the softened plastics coats the grains of sand or crushed brick, stone or gravel, but without the grains being compacted together.

The mixture is then ready to be used as a ground covering. For this purpose, it is spread out on the ground, it is levelled, and then it is heated in situ, for example by means of a current of hot air or an infrared lamp, and it is compacted by means of a compressing roller. In this way, there is obtained a covering or surfacing slightly similar to that obtained with bitumen, but which firstly retains the colour of the brick, stone or gravel, and which secondly is reinforced by the fibrous lattice formed by the "hard" rodlets, which are not softened under the effect of the heat.

What is claimed is:

1. A process for the production of composite products from waste plastic materials as collected from various origins having varying densities and thicknesses and containing a heterogeneous mixture of thermoplastic resins (a) having a softening temperature below about 200 C. and resins (b) which retain their discrete form at the softening temperature of thermoplastic resins (a) comprising comminuting said heterogeneous mixture of thermoplastic resins (a) and resins (b) into the form of rods by rolling the mixture into a flat form having superposed layers packed one against another but not agglomerated, cutting the rolled mixture into strips having a width corresponding to a desired length of the rods and transversely cutting the strips to form the rods having the desired width, separating the layers, separating the rods by density into light rods and heavy rods and separating each group of light and heavy rods by screening into thick and thin rods respectively, said thick rods having a thickness greater than the remaining thin rods and remixing the thick rods with the light, thin rods in predetermined proportions, the proportion of thermoplastic resins (a) being sufficient when softened to bond resins (b), blending said comminuted mixture of rods to form a homogeneous mixture thereof, heating said homogeneous mixture to the softening temperature of thermoplastic resins (a) to cause said resins to flow around and between the particles of resins (b) to bond the mixture into a mass and forming a composite product from the mass.

2. A process as claimed in claim 1 wherein the rods have a length of from a few millimeters up to about 15 millimeters and a width of from several tenths of a millimeter up to about 1.5 millimeters.

3. A process as claimed in claim 1 wherein additional thermoplastic resin having a softening temperature below about 200° C. is added to the rods, before heating the mixture, to ensure the presence of at least sufficient thermoplastic resins (a) to bond resins (b).

4. A process as claimed in claim 1 and further comprising the step of removing excessively coarse particles from the light, thin particles in the powdered mixture prior to heating the mixture.

5. A process as claimed in claim 1 wherein said heterogeneous mixture includes at least one filler selected from the group consisting of a mineral filler and an organic filler.

6. A process as claimed in claim 5 wherein the mineral filler is selected from the group consisting of cement and plaster and further comprising compacting said mixture after heating and then adding water thereto in an amount necessary to set the mineral filler.

7. A process as claimed in claim 6 wherein sand is added to the mineral filler.

8. A process as claimed in claim 5 wherein the mineral filler is selected from the group consisting of sand and finely divided stone, brick and gravel and further comprising stirring said mixture while being heated to coat the filler with the softened thermoplastic resins.

9. A process as claimed in claim 1 and further comprising forming the blended mixture into a uniform layer and passing the layer through heated rollers while applying pressure to obtain a composite compact product in the form of a sheet.

10. A process as claimed in claim 8 and further comprising spreading the mixture on a surface and rolling after the heating step to form a compacted surface covering.

References Cited
UNITED STATES PATENTS

| | | | |
|---|---|---|---|
| 3,328,383 | 6/1967 | Roscher | 264—122 X |
| 2,433,727 | 12/1947 | Arnold | 264—Dig. 69 |
| 3,354,099 | 11/1967 | Stegeman | 264—122 X |
| 3,399,255 | 8/1968 | Moelhlman | 264—122 X |

FOREIGN PATENTS

| | | | |
|---|---|---|---|
| 998,159 | 7/1965 | Great Britain | 264—122 |

ROBERT F. WHITE, Primary Examiner

T. P. PAVELKO, Assistant Examiner

U.S. Cl. X.R.

264—115, 122, 140, 145, 152, 175, Digest 43, Digest 69; 404—72